April 7, 1953  E. F. RIOPELLE  2,633,719
COUPLING FOR MISALIGNED SHAFTS
Filed May 29, 1948
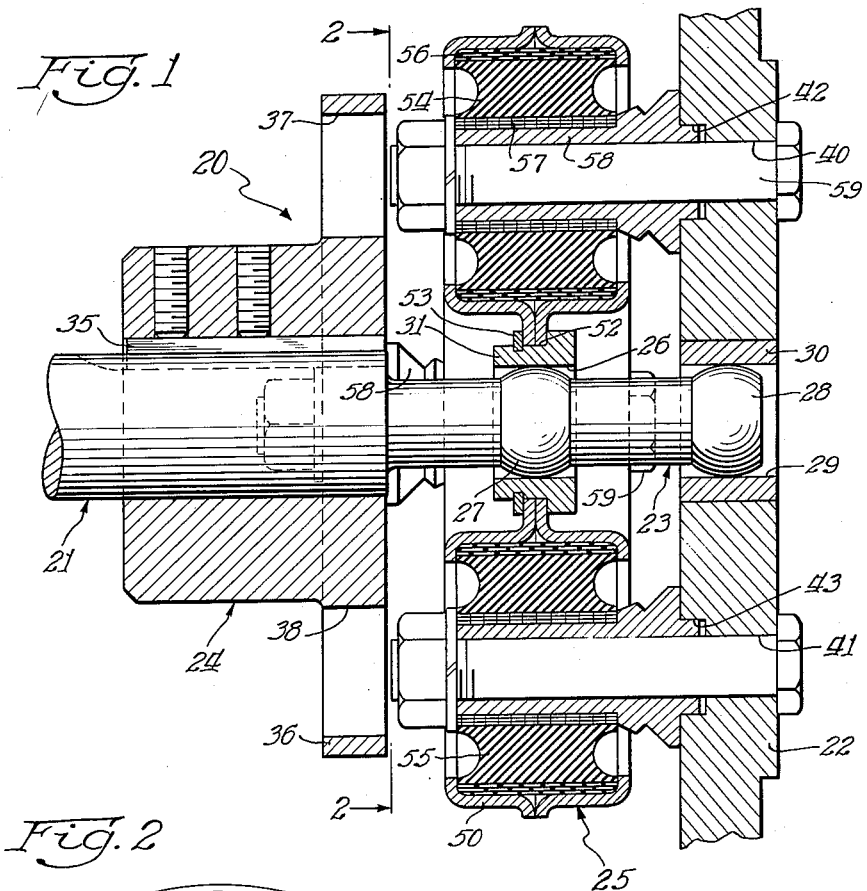
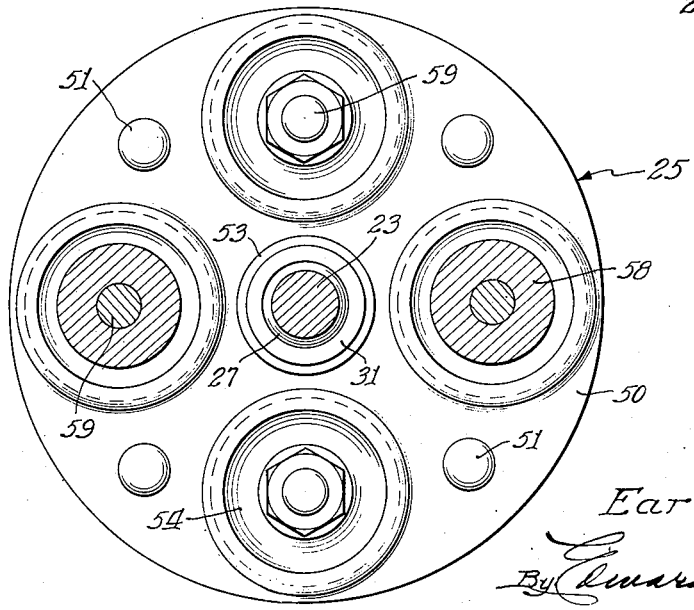
Inventor:
Earl F. Riopelle
By Edward Gritzbaugh
Atty.

Patented Apr. 7, 1953

2,633,719

UNITED STATES PATENT OFFICE 2,633,719

COUPLING FOR MISALIGNED SHAFTS

Earl F. Riopelle, Detroit, Mich., assignor, by mesne assignments, to Morse Chain Company, Ithaca, N. Y., a corporation of New York Application May 29, 1948, Serial No. 30,169

4 Claims. (Cl. 64—11)

This invention relates to flexible couplings and is particularly concerned with such flexible couplings characterized as being adaptable for high speed operations.

Heretofore, in flexible couplings of this general class, unbalanced running operation at high speeds has been found particularly objectionable because of the vibrations set forth and transmitted through mechanisms adjacent the coupling. The present invention seeks to overcome the deficiencies of the prior art flexible coupling structures by the provision of a flexible coupling constrained to run on a fixed center line thereby producing perfect running balance.

Accordingly, an object and accomplishment of the invention is to provide a flexible coupling incorporating a piloted shaft arrangement of such character as to provide for the flexible coupling to be constrained to run on a fixed center line, the slight angular misalignment of the shaft during running operations being advantageously accommodated by the flexibility of coupling members. Thus, any tendency for vibrations of a slightly bent shaft will be effectively eliminated because of the restraint of the end portion of the shaft to what might be called a close approximation of a fixed center line. The applicant's construction will efficiently perform the function required of it, first, because of this aforementioned restraint and, second, because of the fact that any slight vibration, which would result even though the shaft is restrained, will be absorbed by the flexible coupling.

The invention seeks, as a further object and accomplishment, to provide a flexible coupling as contemplated and characterized by an arrangement of parts to more advantageously and satisfactorily perform the function required of it and adapted to provide a compact unit which will successfully combine the factors of structural simplicity and durability, and yet be economical to manufacture.

Another object and accomplishment of the invention is to improve the construction of flexible couplings as herein contemplated with respect to efficiency of operation; and to this end, an important feature of the invention is to provide a flexible coupling comprising a drive shaft and a driven member, said drive shaft having end portions thereof piloted into said driven member, a hub member carried by said drive shaft, and a flexible center-member assembly mechanically operatively associated with said hub member and said driven member, said flexible coupling having an aperture adapted to receive portions of the pilot end portions of said drive shaft, thereby advantageously to accomplish running balance at high speeds and accommodate misalignment between the drive and driven members by the flexibility of the flexible coupling.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and, as more particularly pointed out in the appended claims, reference being had to the accompanying drawing, which forms a part of this specification wherein:

Fig. 1 is a sectional elevational view of a flexible coupling embodying the features of this invention and illustrating the relative disposition of the drive and driven members with respect to the piloted shaft and flexible center-member assembly; and Fig. 2 is an elevational view of the flexible coupling depicted in Fig. 1 and being taken substantially on the plane of the line 2—2 in Fig. 1.

The drawing is to be understood to be more or less of a schematic character for the purpose of illustrating and disclosing a typical or preferred form of the improvements contemplated herein, and in the drawing like reference characters identify the same parts in the several views.

In the exemplary embodiment of the invention depicted in Figs. 1 and 2, I have illustrated a flexible coupling as contemplated herein and designated in its entirety by the numeral 20 and comprising, in general, a drive shaft 21 and a driven member 22, said drive shaft having end portions 23 thereof piloted into said driven member, a hub member 24 carried by said drive shaft 21, and a flexible center-member assembly designated in its entirety by the numeral 25 and being mechanically operatively associated with said hub member 24 and said driven member 22, said flexible coupling having a central aperture 26 adapted to receive portions of the pilot end portions 23 of said drive shaft 21, thereby to accomplish running balance at high speeds and accommodate misalignment between the drive and driven members by the flexibility of the flexible coupling.

In accordance with the construction of the present invention, the drive shaft may be driven by any power source (not shown) and is provided with the pilot end portion 23 having ball pivots 27 and 28, the ball pivot 28 being adapted to be received for pivotal action into a central aperture 29 of an insert 30 disposed in the driven member as shown in Fig. 1. The ball pivot 27 being adapted to be received for pivotal action into the central aperture 26 of a removable central hub 31 of the flexible center-member assembly 25.

Removably, but fixedly secured to the shaft 21 for rotation therewith is the hub 24 which is provided with a suitable key seat and key arrangement designated in its entirety by the numeral 35 and a flange 36 having apertures 37 and 38 whose function will be hereinafter described in detail.

The driven member 22, for purposes of illustration, may be a portion of a machine employed adjunctively to the flexible coupling or may be a hub substantially of the design as illustrated with respect to the hub disclosed as at 24. In either event the driven member 22 is provided with bores 40 and 41 which bores are respectively provided with counterbores 42 and 43.

An important feature of this invention is the provision of the flexible center-member assembly 25 operatively disposed between the hub 24 and the driven member 22, said flexible member assembly being provided with preloaded rubber biscuits whose live, muscle-like flexibility advantageously takes the wrap-up of torsional loads, thereby to protect machine installations to which the present flexible coupling may be adjunctively employed from shock, vibration and uneven impulses. In accordance with this construction, misalignment stresses are minimized and bearing life increased. Moreover, the employment of flexible members as contemplated herein advantageously eliminates metal-to-metal contact between the driving and driven members and requires no lubrication, is impervious to dirt, dust and weather.

As illustrated in Fig. 1, the flexible center-member assembly 25 comprises an outer cover 50 formed to define pockets radially disposed of the shaft 21 and adapted to receive the muscle-like flexible members to be hereinafter described. Preferably, the outer cover 50 is made in two complementary parts and is finally assembled and held in operative position by rivets 51 (Fig. 2). It can be seen in Fig. 1 that center portions of the outer cover 50 are adapted to be received into a recess 52 in the central hub member 31 and, in order to provide for the removal of the cover from the hub 31, there is provided a snap ring 53 which may be removed and the portions of the cover adjacent thereto may be moved toward the left, thereby removing the hub 31 from the flexible center-member assembly.

The muscle-like flexible members, herein also referred to as biscuits and designated as at 54 and 55, are designed for uniform stress and linear deflection, all relative movement being accommodated by controlled displacement of the compressed rubber. In order to maintain dimensional stability there is provided a fabric ring 56 which is impregnated with the molded rubber and forms the outer surface of the biscuit. As a biscuit core there is provided a metallic screen 57 which, through impregnated bonding with the rubber, permits a heavy press fit to a bushing 58 which is assembled under pressure into the metallic biscuit core, this machined bushing, after assembly, being integral with the entire flexible center-member assembly. As illustrated in Fig. 1, the pilot of this bushing fits into the counterbore 42 of the driven member. Bolts as at 59 are employed to secure the coupling center-member to the driven member and are subject to only tensional stresses; the shear being taken up entirely by the bushing. In this manner, stresses in the bolts are kept to a minimum.

It is notable that, in the present instance, two bolts are employed to connect the flexible center-member assembly to the driven member 22 and two bolts are employed to connect the flexible center-member assembly to the hub 24. The foregoing arrangement is further characterized in its mode of operation in that any relative movement between the driven member 22 and the hub 24 will not interfere with the operation of the flexible center member assembly and the bolts 59 of the apertures 37 and 38. Also, these last mentioned apertures have the additional function of allowing access to the nuts on the bolts 59.

It is notable that relative movement between the drive shaft 21 and the driven member 22 is confined to the controlled displacement of the rubber. Preloading of the biscuits in assembly permits them to allow considerable deflection. The shape of the rubber biscuit is of importance since it has been carefully designed for uniform stress and deflection—an important operational advantage and one which contributes greatly to the life of the coupling. The design and preloading of the rubber biscuits provides advantageous operation in axial displacement resulting from thrust loads and accommodates angular deflection and torsional deflection resulting from torque loads and torsional vibration, torsional deflection being overcome by the fact that imposition of a torque load increases pressure in direction of the load and reduces pressure in the opposite direction. Because of the initial preloaded condition, the rubber biscuit is still under compression throughout its volume even at a maximum torque load.

Adapted for cooperative action with the aforementioned features of the flexible center-member assembly is the piloted shaft arrangement disclosed. The piloted shaft is of paramount importance and provides the shaft and flexible center-member assembly to be piloted and supported at each end by the ball pivots 27 and 28 disposed in the flanges affixed to the driving and driven members. In this manner the torsional flexibility of the coupling and shaft is unimpaired, yet the shaft is constrained to run on a fixed center line. This is important where couplings of the character described are employed in high speed operations since it is impossible, from a practical standpoint, to provide proper balance to eliminate or minimize vibrations of the couplings in such high speed operations. In the prior art couplings such vibrations in high speed operations are very objectionable. Perfect running balance is impossible to attain with such prior art designs whereas it is very easy to accomplish when all of the rotating parts are running on a fixed center line as provided in the contemplated structure disclosed herein. It is notable that misalignment of the shafts is accommodated by the flexibility of the biscuits in the flexible center-member assembly.

From the foregoing disclosure there has been provided a flexible coupling for misaligned shafts which efficiently fulfills the objects thereof as hereinbefore set forth and which provides advantages which may be summarized as follows:

1. Structurally simple, efficient and durable;
2. Economical to manufacture and readily adaptable to mass production manufacturing principles; and 3. The provision of a flexible coupling for misaligned shafts which incorporates a piloted shaft arrangement of such character as to provide for the flexible coupling to be constrained to run on a fixed center line, thereby overcoming and minimizing objectionable vibrations in high speed operations.

While I have illustrated a preferred embodiment of my invention, many modifications may be made without departing from the spirit of the invention, and I do not wish to be limited to the precise details of construction set forth, but wish to avail myself of all changes within the scope of the appended claims.

I claim:

1. A combination flexible coupling universal joint comprising, a pair of hub members having interconnected therebetween flexible coupling means including rubber bushings to accommodate annular displacement with respect to said hub members responsive to rotative and resistant forces respectively applicable to one or the other of said hub members, shaft means connected to one of said hub members with an end portion thereof projecting through and engaged with a central region of said flexible coupling means and piloted into and engaged with a central region of said other hub member, annular protuberances integrally formed with said shaft means and respectively disposed at the points of engagement with said flexible coupling means and said other hub member and arranged to permit relative movement between the elements at said points of engagement responsive to annular displacement and angular misalignment of said hub members, said flexible coupling means being yieldingly responsive to accommodate both annular displacement and angular misalignment of said hub members to provide constant resilient resistant force reacting on each of said hub members, and said shaft means at the point of engagement therewith to urge said hub members into proper alignment.

2. A combination flexible coupling universal joint comprising, a pair of hub members having interconnected therebetween flexible coupling means including rubber bushings to accommodate annular displacement with respect to said hub members responsive to rotative and resistant forces respectively applicable to one or the other of said hub members, shaft means connected to one of said hub members with an end portion thereof projecting through and engaged with a central region of said flexible coupling means and piloted into and engaged with a central region of said other hub member, said arrangement permitting limited angular misalignment with respect to said hub members, and said flexible coupling means being yieldingly responsive to accommodate both annular displacement and angular misalignment of said hub members to provide constant resilient resistant force reacting on each of said hub members and said shaft means to urge said hub members into proper alignment.

3. A combination flexible coupling universal joint comprising, a pair of hub members disposed in spaced confronting relationship, shaft means connected to one of said hub members with an end portion being piloted into and in engagement with a central region of the other hub member, an annular protuberance integrally formed with said shaft means at the point of engagement with the other hub member, an annular protuberance integrally formed with said shaft means and disposed intermediate the end portion of said shaft and between said hub members, flexible coupling means connected between said hub members and having a central region thereof in engagement with said intermediate annular protuberance, said annular protuberances being arranged to permit relative movement between the elements at the respective points of engagement responsive to annular displacement and angular misalignment of said hub members, and said flexible coupling means having rubber bushings yieldingly responsive to accommodate both annular displacement and angular misalignment of said hub members actuated by rotative and resistant forces respectively applicable to one or the other of said hub members thereby to provide a constant resilient resistant force reacting on each of said hub members and said shaft means at the point of engagement therewith to urge said hub members into proper alignment.

4. In a combination flexible coupling universal joint, a pair of hub members disposed in spaced confronting relationship; shaft means connected to one of said hub members and with an end portion thereof being piloted into and in engagement with a central region of the other hub member; an annular protuberance integrally formed with said shaft means at the point of engagement with the other hub member; and an annular protuberance integrally formed with said shaft means and disposed intermediate the end portion of said shaft and between said hub members; in combination with flexible coupling means connected between said hub members and having a central region thereof in engagement with said intermediate annular protuberance, said annular protuberances being arranged to permit relative movement between the elements at the respective points of engagement responsive to annular displacement and angular misalignment of said hub members, and said flexible coupling means having rubber bushings yieldingly responsive to accommodate both annular displacement and angular misalignment of said hub members actuated by rotative and resistant forces respectively applicable to one or the other of said hub members facilitating a constant resilient resistant force reacting on each of said hub members and said shaft means at the point of engagement therewith to urge said hub members into proper alignment.

EARL F. RIOPELLE.

REFERENCES CITED

The following references are of record in the file of this patent:

UNITED STATES PATENTS

| Number | Name | Date |
|---|---|---|
| 2,386,754 | Snyder | Oct. 16, 1945 |

FOREIGN PATENTS

| Number | Country | Date |
|---|---|---|
| 238,064 | Great Britain | Aug. 5, 1925 |
| 542,477 | Great Britain | 1942 |